United States Patent [19]
Schutzler et al.

[11] 4,439,392
[45] Mar. 27, 1984

[54] METHOD AND APPARATUS FOR MAKING A GLASS LAMINATED STRUCTURE

[75] Inventors: Jerome C. Schutzler, El Toro; Kurt E. Jechel, Santa Ana, both of Calif.

[73] Assignee: PDA Engineering, Santa Ana, Calif.

[21] Appl. No.: 443,590

[22] Filed: Nov. 22, 1982

[51] Int. Cl.³ .............................................. B29C 6/04
[52] U.S. Cl. ................................. 264/511; 264/101; 264/DIG. 78; 264/277; 264/261; 425/123; 425/128; 425/405 R
[58] Field of Search ............... 264/511, 101, DIG. 78, 264/277, 261; 425/110, 123, 125, 126 R, 127, 128, 405 R, 405 H

[56] References Cited

U.S. PATENT DOCUMENTS

| | | | |
|---|---|---|---|
| 2,020,178 | 11/1935 | Haas | 264/261 |
| 2,064,514 | 12/1936 | Balz | 264/101 X |
| 3,257,484 | 6/1966 | Barnette | 264/261 X |
| 3,529,321 | 9/1970 | Eulard | 425/405 H X |
| 3,541,642 | 11/1970 | Bernardi et al. | 425/405 R X |
| 3,551,541 | 12/1970 | Rossetti | 425/405 R X |
| 3,579,738 | 5/1971 | Beattie | 425/405 R X |
| 3,694,129 | 9/1972 | Daddona | 425/405 R X |
| 3,703,425 | 11/1972 | Delmonte et al. | 264/261 |
| 3,751,201 | 8/1973 | Kelsey | 425/123 |
| 3,846,525 | 11/1974 | Kinne et al. | 425/123 X |
| 4,012,186 | 3/1977 | Ramagzotti et al. | 425/123 |
| 4,128,375 | 12/1978 | Schubart | 425/405 H |
| 4,299,639 | 11/1981 | Bayer | 264/261 X |

OTHER PUBLICATIONS

Article from Defense Nuclear Agency, Wash. D.C., Passive Thermal Protection Flight Evaluation, Aug. 17, 1981.

Primary Examiner—Howard J. Flint, Jr.
Attorney, Agent, or Firm—Gordon L. Peterson

[57] ABSTRACT

A method of making a glass laminated structure comprising retaining first and second glass panels against first and second platens respectively, using differential fluid pressure. The panels are held in spaced, generally parallel relationship and a curable flowable material is introduced into the space between the panels. The flowable material is then cured to provide the glass laminated structure.

23 Claims, 11 Drawing Figures

METHOD AND APPARATUS FOR MAKING A GLASS LAMINATED STRUCTURE

BACKGROUND OF THE INVENTION

Thermal radiation from a nuclear blast is very intense and can start fires and cause temporary or permanent blindness even at substantial distances from the center of the blast. For example, the thermal radiation could be injurious to the crew of an aircraft in the vicinity of a nuclear blast.

Glass transmits a high percentage of the thermal radiation which is incident upon it, and accordingly, the windows of the aircraft or other structure in the vicinity of the nuclear blast typically provide the greatest radiation leakage path to the interior of the structure. Thermal energy transmission through a window can be substantially reduced by incorporating photochromic dyes and infrared filters into the window. It is known to accomplish this by sandwiching a core of epoxy containing the photochromic dye between glass panels. This laminated structure transmits light in the visible range under normal, or benign, conditions and may be used as a window or laminated to an existing window. When exposure to intense thermal radiation levels in the vicinity of a nuclear blast, the photochromic material undergoes a temporary transformation and blocks the transmittance of much of the thermal radiation.

Although this laminated structure performs its functions well, it is difficult to make. For example, although the core can be cast and cured, it is difficult to retain the glass panels in position during the casting and curing process. This problem increases as the dimensions and mass of the glass panels increase. In addition, the broad surfaces or faces of each of the glass panels must be flat and parallel in order for the laminate to perform its functions properly. Conventional purchased glass panels are typically slightly warped or sufficiently uneven to perform well for this purpose. In addition, casting of the core causes heat transfer to the glass panels and whatever tooling is used to retain them. The glass panels and the tooling typically have different coefficients of expansion, and this further complicates retention of the panels.

SUMMARY OF THE INVENTION

With this invention, first and second glass panels are retained in spaced, generally parallel relationship by first and second platens. The glass panels are held against confronting faces of the platens using differential fluid pressure acting across the panels. This is a convenient and easy way to retain panels of all sizes. In addition, by providing an appropriate vacuum path on each of the platens, the glass panels can be held against the associated platens with sufficient force to deform them to closely conform to the face of their panel.

The confronting faces of the platens should be accurately configured so that the glass panels are conformed to the desired configuration. Although various configurations can be used, for a laminated glass structure of the type used for thermal radiation protection, the confronting faces of the platen should be essentially planar and parallel. Typically, the glass panels will not be deformed substantially, but sufficiently to make a noteworthy improvement in the optical characteristics of the ultimately formed article. To cause the glass panel to conform to the planar configuration of the face of the associated platen, the vacuum path preferably covers various spaced regions along the face and may comprise, for example, a series of intersecting lines along which the vacuum can be pulled to draw outer and central regions of the panel tightly against the face.

With the glass panels held in spaced parallel relationship, a curable flowable material can be introduced into the space between the panels and allowed to cure to form the laminate. The flowable material may be, for example, a suitable epoxy carrying an appropriate photochromic type. If the glass laminate is to serve as, or be used in conjunction with, a window, the curable material should transmit a high percentage of light in the visible spectrum. In a broader sense, however, curable material can be selected in accordance with the function to be performed by the glass laminate. For example, if the glass laminate need not protect against thermal radiation, the photochromic dyes can be eliminated, and if the laminate is not to be used for visual observation, the curable material need not transmit any, or a high percentage of, light in the visible spectrum.

To facilitate loading of the glass panels onto the platens, the platens are preferably movable between a first or loading position in which the faces are exposed to facilitate the placement of the panels onto the platens and a second or casting position in which the faces of the platens and the glass panels are in spaced generally parallel relationship. Although the platens could be mounted for translation between the first and second positions, it is preferred to pivot the platens between these positions. The platens and panels are preferably horizontal in the first position and vertical in the second position.

With the panels in second position, there is a peripheral opening between them. With this invention, this peripheral opening is closed to define an essentially closed space into which the flowable material can be cast.

In some instances, it is necessary or desirable to provide a laminated structure in which there is another member essentially co-planar with one or both of the glass panels. For example, it may be desirable to employ a frame which partially or fully circumscribes each of the glass panels for mounting the laminated structure or for other purposes. With this invention, first and second frames or other members can be retained on the first and second platens, respectively, using the same vacuum techniques described above for the glass panels. It is preferred to use separate vacuum paths for the panel and the associated frame because this allows the panel and frame to be separately placed on the platen.

The process of this invention also solves the differential expansion problems noted above. Because the glass panels are retained on platens by vacuum pressure, these two members are free to expand and contract at different rates and this function can be assisted by appropriately lubricating the faces of the platens. Similarly, the glass panels and associated frames may also expand and contract at different rates. To accommodate this, the frame is preferably oversized relative to the associated panel to provide a gap between the panel and frame. A deformable seal is positioned in the gap between the glass panel and the frame to keep the curable material out of this gap. This allows the panel and frame to expand and contract independently and without applying force to each other.

The space between the glass panels can be varied and the depth of this space can be measured. To accurately control the spacing, stop means is provided to accurately locate the platens in the second position.

The apparatus of this invention can be used to make laminated articles comprising panels of glass or other material, and it is not limited to making glass laminated structures.

The invention, together with additional features and advantages thereof may best be understood by reference to the following description taken in conjunction with the accompanying illustrative drawing.

DESCRIPTION OF THE PREFERRED EMBODIMENT

Figures 1, 2, 4:
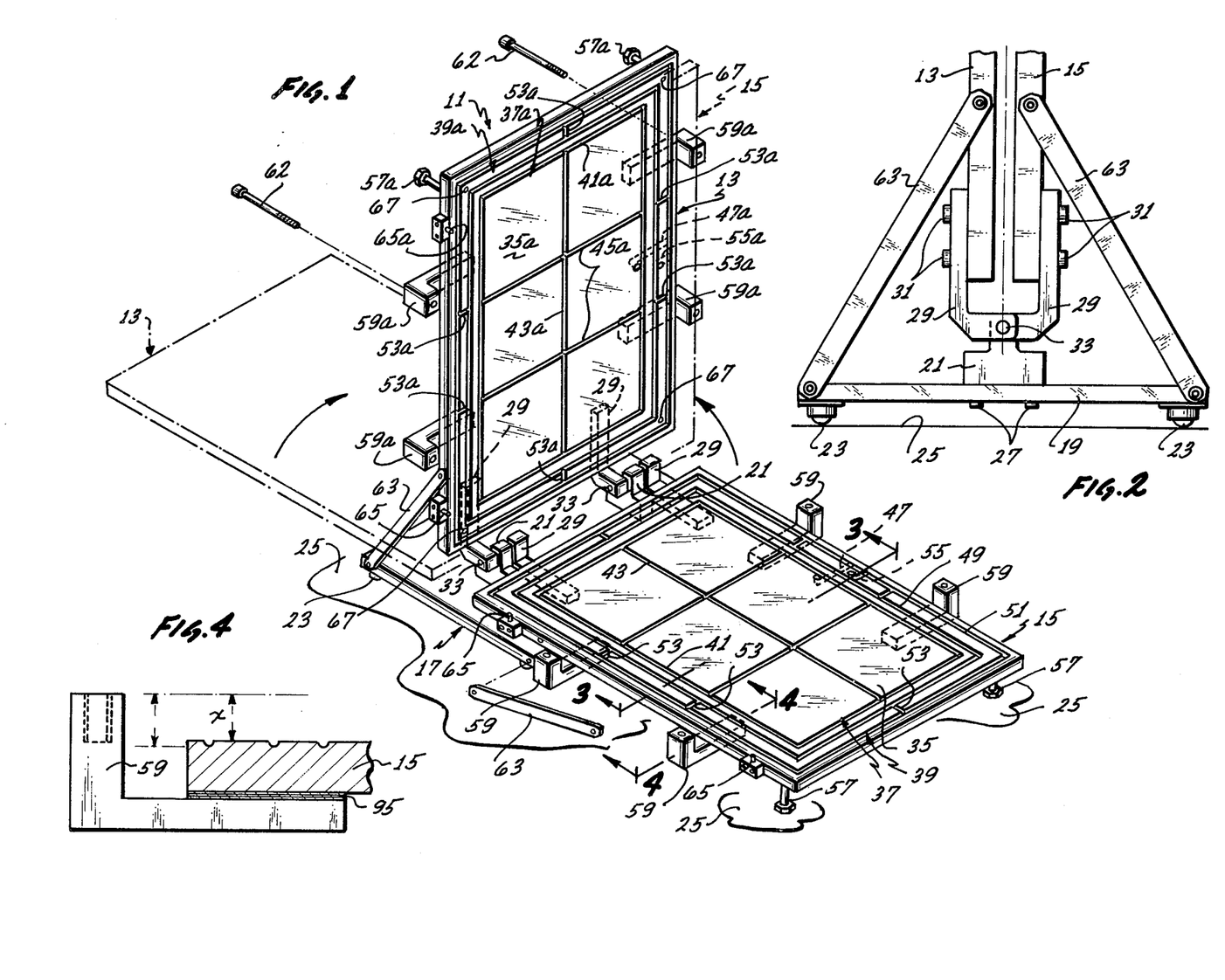
FIG. 1 is a partially exploded perspective view of a preferred form of apparatus which can be utilized to carry out the method of this invention. The platen on the right is shown in full lines in the first position and in phantom lines in the second position and the platen on the left is shown in phantom lines in the first position and in full lines in the second position.
FIG. 2 is a fragmentary end view of the apparatus.
FIG. 4 is an enlarged fragmentary view partially in section showing how the spacing between glass panels can be varied.
Figure 3:
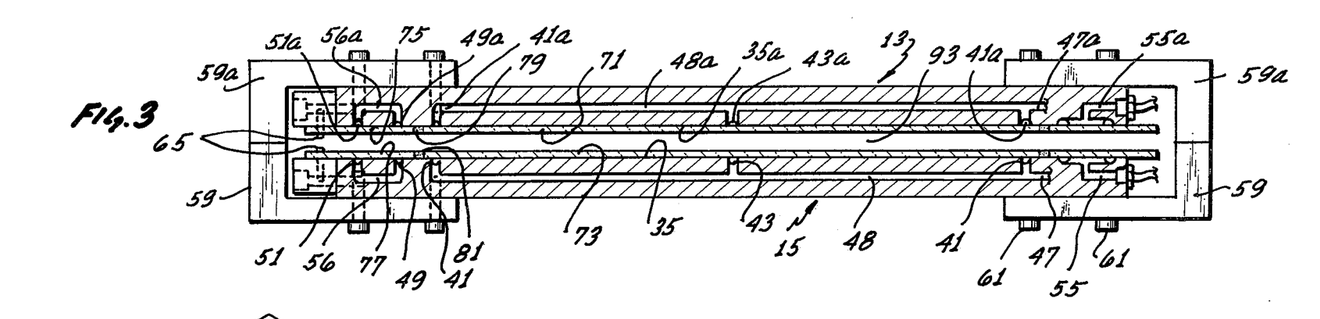
FIG. 3 is a sectional view of the apparatus with the platens in the second position and taken on a horizontal plane looking downwardly.

FIGS. 1-3 show an apparatus in the form of tooling 11 which can be used to carry out the method of this invention. In the embodiment illustrated, the tooling 11 comprises two substantially identical platens 13 and 15 mounted on supporting structure 17 for pivotal movement between a first or loading position and a second or casting position. Although various orientations are possible, preferably the platens 13 and 15 are generally horizontal in loading position and generally vertical in the casting position.

The supporting structure 17 can be of any construction which is suitable for mounting the platens 13 and 15 for the necessary movement. In the embodiment illustrated, the supporting structure 17 includes a base 19 in the form of a relatively broad flat plate, identical bearing blocks 21 mounted on the upper face of the base 19, and a plurality of wheels 23 mounted on the base 19 for supporting the base for rolling movement along a floor 25 or other supporting surface. The wheels 23 support the base 19 above the floor 25 as shown in FIG. 2, and each of the bearing blocks 21 may be attached to the base 19 by fasteners such as screws 27.

Although many different constructions can be used, in the form illustrated, the platens 13 and 15 are mounted for pivotal movement on the bearing blocks 21 by L-shaped brackets 28 which are rigidly attached to the platens in any suitable manner such as by screws 31 (FIG. 2) and pivotally mounted on the bearing blocks 21 by rods 33. The rods 33 are coaxial and define a horizontal pivot axis for the platens 13 and 15.

The platens 13 and 15 may be constructed of a suitable metal such as aluminum and may be of various different configurations depending upon the shape of the laminated structure which is to be made using the platens. In the embodiment illustrated, the platens 13 and 15 are rectangular, and this rectangular configuration is purely illustrative.

Because the platens 13 and 15 are substantially identical, only the platen 15 is described in detail herein and corresponding portions of the platen 13 are designated by corresponding reference numerals followed by the letter a. The platen 15 is in the form of a rectangular, essentially solid, plate having a broad face 35 which is exposed in the first, i.e., horizontal position of the platen. The platen 15 has an inner vacuum path 37 and an outer vacuum path 39 which, in the embodiment illustrated, extends continuously completely around the inner vacuum path. Except for the vacuum paths 37 and 39, the face 35 is flat and planar. The paths 37 and 39 form vacuum path means for communicating vacuum pressure to the face 35 even when the face 35 is covered. The vacuum paths 37 and 39 are separate and isolated from each other so that a vacuum can be pulled on one and not the other.

Figures 7, 8, 9, 10:
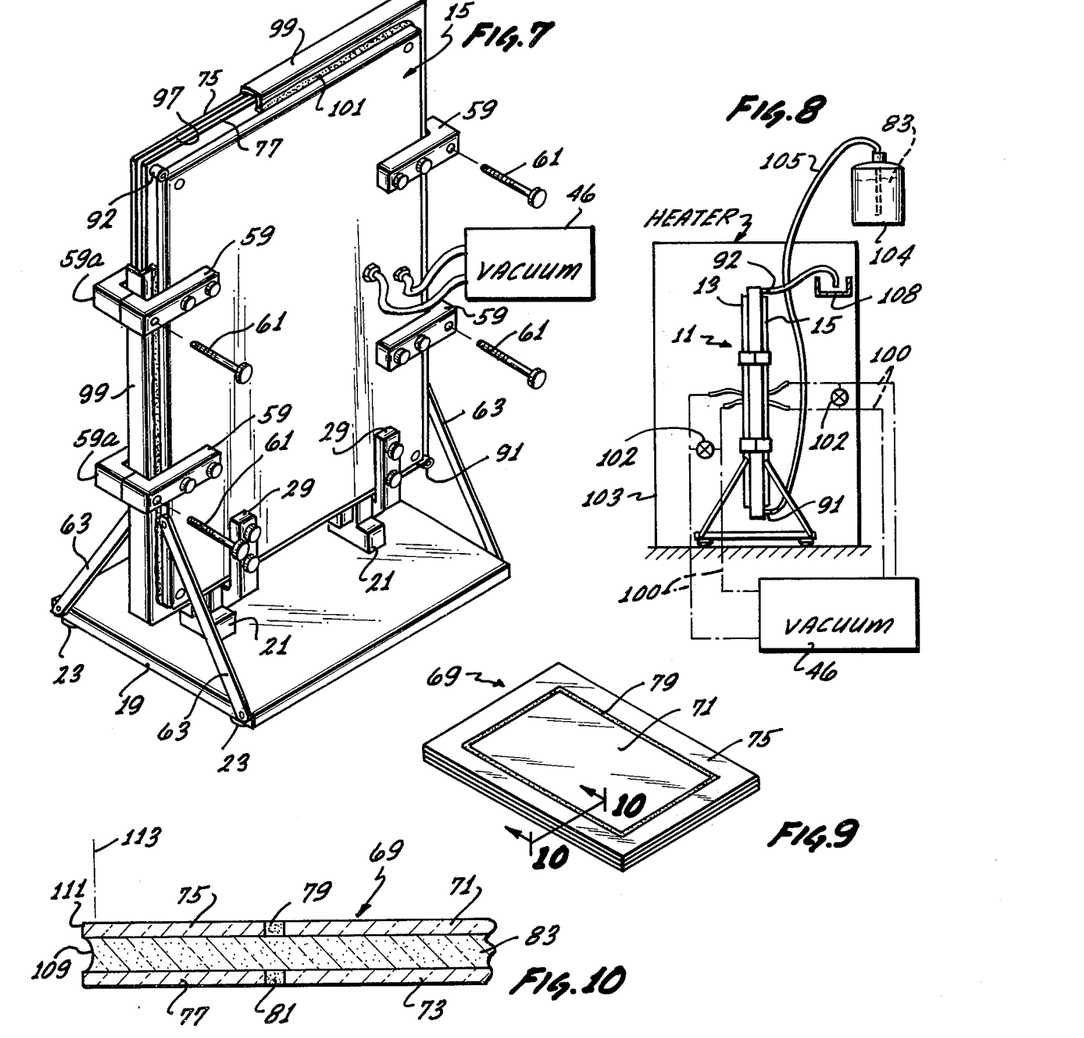
FIG. 7 is a perspective view partially in section of the apparatus with the platen in the second position.
FIG. 8 is a partially schematic end elevational view illustrating the equipment for casting and curing the flowable material.
FIG. 9 is a perspective view of the glass laminated structure.
FIG. 10 is an enlarged fragmentary sectional view taken generally along line 10—10 of FIG. 9 prior to trimming the edges of the laminated structure.

To enable the vacuum path 37 to tightly retain a broad panel, the path includes a rectangular peripheral path section 41, a longitudinal path section 43 extending longitudinally through a central region of the face 35 from one end of the peripheral path section 41 to the other and transverse path sections 45 which extend in parallel relationship between the opposite longitudinal sides of the peripheral path section 41. In the embodiment illustrated, there are two of the path sections 45 and they are equally spaced from each other and from the adjacent end of the peripheral path section 41. Of course, the particular configuration of the vacuum path 37 is purely illustrative. The vacuum path 37 also has an inlet 47 which can be suitably coupled to a source of vacuum such as a vacuum pump 46 (FIGS. 7 and 8). Preferably the inlet 47 is directly joined to the passage sections 41 and 43 by a passage section 48 which extends through the interior of the platen 15 as shown in FIG. 3.

The outer vacuum path 39 comprises peripheral path sections 49 and 51 interconnected by a plurality of connector path sections 53. The peripheral path sections 49 and 51 are rectangular and extend continuously and completely around the inner vacuum path 37. The peripheral path sections 41, 49 and 51 are coaxial and the connector path sections 53 are aligned with the path sections 43 and 45, respectively. The particular configuration of the outer vacuum path 39 shown in the drawings is purely illustrative, although the circumscribing nature of the outer vacuum path 39 facilitates the retention of a frame-like member as described more fully hereinbelow. The outer vacuum path 39 also has an inlet 55 which can be coupled to the vacuum pump 46 and a passage section 56 (FIG. 3) in the platen 13 for joining the passage sections 49 and 51.

The platens 13 and 15 have stop means defining the two positions of the platens. Although the stop means can be of different constructions, in the embodiment illustrated, the platen 15 has feet 57 which rest on the floor 25 to define the first position. The feet 57 can be screwed into the outer end of the platen 15 varying amounts so that the height of the platen 15 in first position can be varied.

To establish the second position, a plurality (four being illustrated) of generally L-shaped blocks 59 are mounted on the platen by screws 61. The blocks 59 are engagable as shown in FIG. 3 to define the second position of the platens. In the second position, the faces 35 and 35a are in spaced parallel relationship. Threaded fasteners 62 can be passed through the confronting blocks 59 and 59a to retain the platens 13 and 15 in the second position. In addition, arms 63 can be attached to the base 19 and to the platens 13 and 15, respectively to individually retain the platens in the second position.

The platen 15 has a plurality of locator pins 65 (two being illustrated in FIG. 1) located along one longitudinal edge outside the peripheral path section 51. The platen 13 also has depth holes 67 extending completely through the platen at all four corners between the peripheral path sections 49 and 51 to permit the insertion of a depth gage to accurately measure the spacing between the faces 35 and 35a in the second position. The holes 67 are tapped so they can be sealed by a suitable threaded plug during the molding operation. The platen 15 does not have any of the holes 67.

Figure 11:
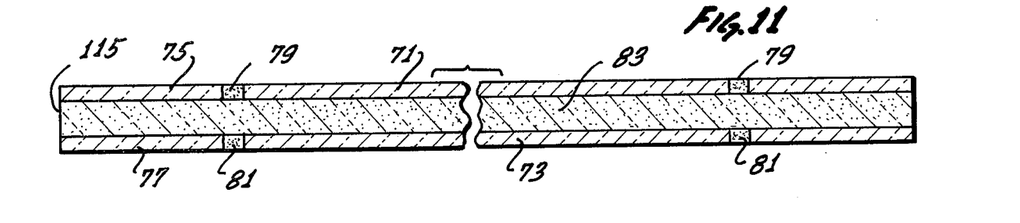
FIG. 11 is a sectional view similar to FIG. 10 showing the laminated structure after the edges have been trimmed.

Although the tooling 11 is adapted to make various different laminated articles, it is particularly adapted for making a glass laminated structure 69 (FIGS. 9-11). The structure 69 comprises broad rectangular glass panels 71 and 73 of identical size and shape, rectangular frames 75 and 77 circumscribing the panels 71 and 73, respectively, resilient, deformable seals 79 and 81 for sealing the space between the adjacent panels and frames, and a core 83 sandwiched between the panels and frames for spacing the panels and frames and holding them together. The laminated structure 69 could have different purposes, but in the embodiment illustrated, it serves as a thermal radiation barrier. The glass panel 71 may be a plain strengthened glass panel with or without an indium tin oxide coating on one or both sides and the panel 73 may be plain strengthened glass or an infrared filter glass panel. The frames 75 and 77 may be identical and may be constructed of a glass epoxy such as a woven glass fabric in any epoxy matrix. The core 83 is a photochromic a high percent of thermal radiation from a nuclear blast, but which passes a high percent of the light in the visible range under normal conditions. As shown in FIG. 11, the panel 71, the seal 79 and the frame 75 are coplanar, and the panel 73, the seal 81 and frame 77 are coplanar. The frames 75 and 77 are used for attachment of the laminated structure 69 to mounting structure (not shown).

Figure 5:
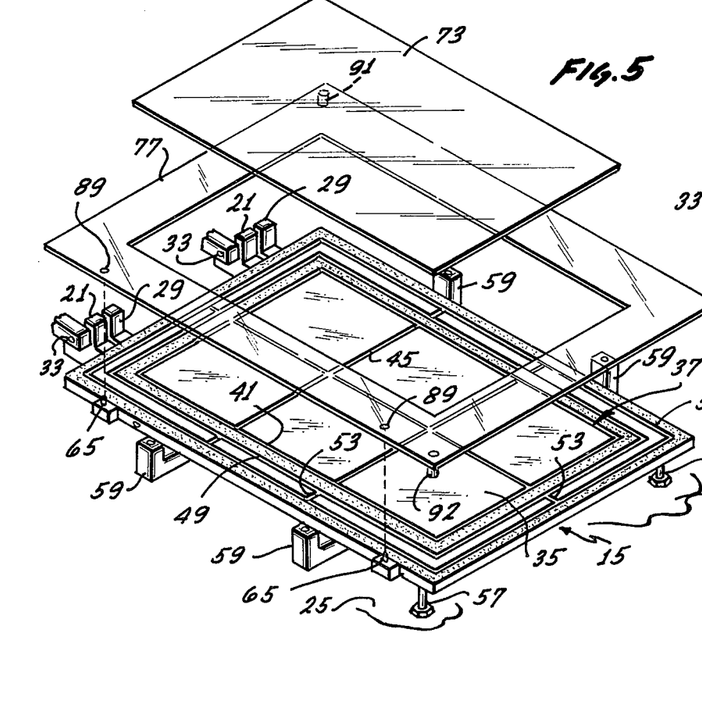
FIG. 5 is an exploded perspective view of the right hand platen illustrating how the glass panel and frame can be placed on the platen.
Figure 6:
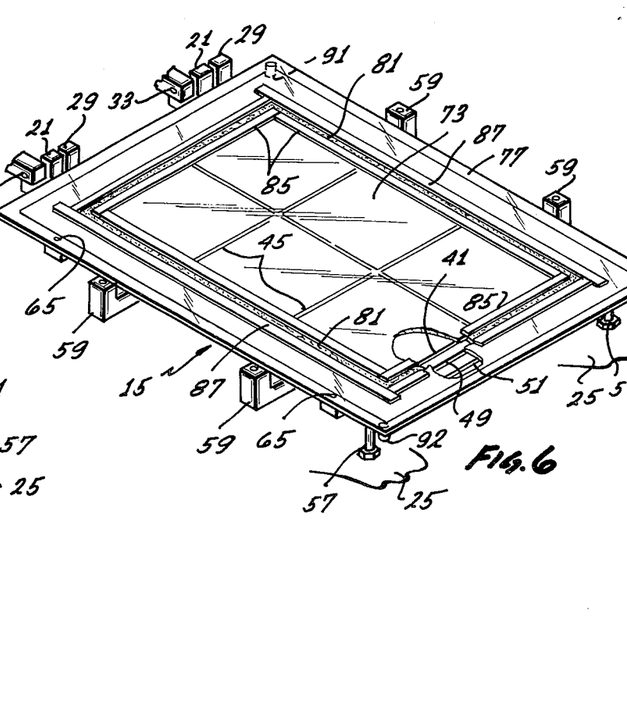
FIG. 6 is a perspective view similar to FIG. 5 with the glass panel, frame and other components on the platen.

FIGS. 5-8 show how the tooling 11 can be used to carry out the preferred method of this invention to make the laminated structure 69. The initial steps of the method are shown in FIGS. 5 and 6 and are illustrated only with respect to the platen 15 because identical steps are carried out with respect to the platen 13. As shown in FIG. 5, the platen 15 is in the first or loading position in which the feet 57 are resting on the floor 25 and the face 35 is horizontal. In preparation for use, the face 35 is greased with an appropriate lubricant such as silicone vacuum grease The frame 77 has its inner periphery masked by masking tape 87 (FIG. 6). In addition, the frame 77 has locator holes 89 adapted to receive the locator pins 65 and a fill port 91 and an overflow port 92 at two of its opposite corners. The frame 77 is placed on the platen 15 with the locator pins 65 being received in the locator holes 89 and with the ports 91 and 92 being at two diagonally opposite corners of the platen as shown in FIG. 6. The locator pins 65 and the holes 89 accurately locates the frame 77 on the face 35. With the frame 77 positioned in this manner, the inner periphery of the frame just covers the peripheral passage section 49. As shown in FIG. 6, an outer peripheral region of the frame 77 lies radially outwardly of the periphery of the platen 15. Vacuum pressure is then applied through the inlet 55 to the outer vacuum path 39 to create a differential pressure across the frame 77 to retain the frame on the face 35. Because the vacuum paths 37 and 39 are isolated from each other, the inner vacuum path 37 does not adversely effect the retention of the frame 77. Following application of the vacuum pressure, the locator pins 65 can be removed.

The panel 73 is thoroughly cleaned and the edges of the panel are masked by masking tape 85. The panel 73 is then placed on the face 35 overlying the inner vacuum path 37. The panel 73 is sized to just cover the peripheral path section 41 and to be spaced radially inwardly from the peripheral path section 49 and from the previously deposited frame 77 so there is a gap between the frame and panel. A thickness block is used to locate the panel 73 relative to the frame 77 so that the gap is of constant thickness all around. After the panel 73 is properly located on the face 35, vacuum pressure is applied through the inlet 47 to create a differential fluid pressure across the panel 73 to retain the panel against the face 35.

The glass panel 73 will typically not be a completely flat panel, but may have a somewhat irregular contour. The differential fluid pressure acting across the panel 73 is sufficient to hold the panel against the face 35 with sufficient force to deform the panel into substantial conformity with the planar portions of the face 35. Thus, the application of vacuum pressure not only retains the panel 93, but also shapes it to the desired contour for use in making the laminated structure 69.

Next, the seal 81 is placed in the gap between the panel 73 and the frame 77. The seal 81 may be silicone rubber and the masking tape 85 and 87 may be a Teflon tape which keeps the silicone rubber off of the panel 73 and the frame 77.

Next, the platens 13 and 15 are pivoted to the second or casting position shown in FIGS. 3 and 7. In this position, which is defined by the engagement of the blocks 59 and 59a, the glass panels 71 and 73 are vertical, parallel and separated by a space or gap 93 (FIG. 3). Because the panels 71 and 73 are vertical in the casting position, any bubbles introduced in the fluid casting medium 83 will rise through the medium to the top overflow port 92 rather than remaining in the medium.

The thickness of the gap 93 can be measured through the holes 67 with a depth gage, and following this the holes are plugged and sealed. The thickness of the gap 93 can be varied as shown by way of example in FIG. 4 by placing a shim 95 between the platen 15 and each of the blocks 59. This reduces the dimension X between the upper face of the platen 15 and the plane of the upper surface of the block 59 to thereby reduce the dimension of the gap 93 by an amount equal to the thickness of the shim 95.

The panels 13 and 15 are securely retained in the vertical or curing position by the screws 62, which pass through the blocks 59 and 59a and by the arms 63 as shown in FIG. 7. In this position, there is a peripheral opening 97 providing communication to the gap 93. The opening 97 is next closed in any suitable manner such as by sealing the full lengths of the edges of the frames 75 and 77 with the tape 99 (FIG. 7), such as aluminum tape, and sealing the edges of the tape with a seal 101 of a suitable elastomeric material. This completely closes and seals the gap 93.

Next, the tooling 11 is rolled on the wheels 23 into an oven 103 where the tooling and its contents are preheated to an elevated temperature. After the elevated temperature is reached, the curable flowable material 83 is cast into the gap 93 with the material 83 being at about the same elevated temperature as the tooling. The vacuum pressure is maintained on the panels 71 and 73 and the frames 75 and 77 via conduits 100 (FIG. 8) throughout the entire process. Manual valves 102 can provide or block communication between the conduits 100 leading to each of the platens 13 and 15.

The casting operation can be carried out with conventional equipment and using conventional techniques. As shown in FIG. 8, the material 83 is stored in heated container 104 and pressurized by nitrogen gas. The material 83 is conducted by a conduit 105 to the fill port 91 at lower end of the frame 77. Excess material 83 flows from the overflow port 92 to a reservoir 108. The material 83 which may be a photochromic epoxy, cures in the oven 103 at elevated temperatures and following this the tooling and laminated structure 69 are cooled slowly.

The coefficients of thermal expansion of the platens 13 and 15, the glass panels 71 and 73 and the frames 75 and 77 are different. Accordingly, during the heating and cooling of these elements, they expand and contract different amounts. The vacuum retention of the glass panels 71 and 73 on the lubricated faces 35a and 35 permits these members to expand and contract at different rates. The resilient deformable seals 79 and 81 accommodate the differential expansion and contraction between the panels 71 and 73 and associated frames 75 and 77.

After the core 83 has cured, it has concave periphery 109 as shown in FIG. 10 due to the shrinkage of the core upon cooling. A peripheral region 11 of the laminated structure 69 is trimmed away along a trim line 113 to form a planar edge 115 as shown in FIG. 11

Although an exemplary embodiment of the invention has been shown and described, many changes, modifications and substitutions may be made by one having ordinary skill in the art without necessarily departing from the spirit and scope of this invention.

We claim:

1. A method of making a glass laminated structure comprising:
    retaining first and second glass panels against first and second platens, respectively, and in spaced generally parallel relationship using differential fluid pressure acting across said panels;
    introducing a curable flowable material into the space between said panels during said step of retaining;
    curing the flowable material to provide said glass laminated structure; and said first glass panel and the first platen have confronting faces of somewhat different configurations and said step of retaining holds the first panel against the first platen with sufficient force to deform the first panel to more closely conform the face of the first panel to the face of the first platen to improve the optical characteristics of the laminated glass structure.

2. A method as defined in claim 1 including placing the first and second platens in a first position, said step of retaining includes retaining the first and second panels on the first and second platens with the first and second platens in said first position, and said method includes moving the first and second platens to a second position in which the platens are in said spaced generally parallel relationship while continuing said step of retaining.

3. A method as defined in claim 2 wherein said step of moving includes pivoting said first and second platens from the first position to the second position.

4. A method as defined in claim 3 wherein the panels are generally horizontal and vertical in the first and second positions, respectively.

5. A method as defined in claim 1 wherein said first and second panels have a peripheral opening when the first and second panels are retained in said spaced generally parallel relationship and said method includes closing said opening.

6. A method as defined in claim 1 including retaining first and second frames against the first and second platens, respectively, in confronting generally parallel relationship using differential fluid pressure acting across said frames and with the first and second frames at least partially circumscribing the first and second panels, respectively.

7. A method as defined in claim 6 wherein there are first and second gaps between the first frame and the first panel and between the second frame and the second panel, respectively, and said method includes placing first and second deformable seals in the first and second gaps, respectively.

8. A method as defined in claim 6 wherein said steps of retaining include applying a negative pressure to first and second vacuum paths in the first platen which communicate, respectively, with the first panel and the first frame, said first and second vacuum paths being separate and substantially isolated from each other.

9. A method as defined in claim 6 including locating the first frame on the first platen utilizing locator pins prior to retaining the first frame on the first platen and locating the first glass panel on the first platen with respect to the first frame prior to said step of retaining the first glass panel on the first platen.

10. A method of making a glass laminated structure comprising:
    retaining first and second glass panels against first and second platens, respectively, and in spaced generally parallel relationship using differential fluid pressure acting across said panels;
    introducing a curable flowable material into the space between said panels during said step of retaining;
    curing the flowable material to provide said glass laminated structure; and
    retaining first and second frames against the first and second platens, respectively, in confronting generally parallel relationship using differential fluid pressure acting across said frames and with the first and second frames at least partially circumscribing the first and second panels, respectively.

11. A method of making a glass laminated structure comprising:
   retaining first and second glass panels against first and second platens, respectively, and in spaced generally parallel relationship using differential fluid pressure acting across said panels;
   introducing a curable flowable material into the space between said panels during said step of retaining;
   curing the flowable material to provide said glass laminated structure;
   retaining first and second frames against the first and second platens, respectively, in confronting generally parallel relationship using differential fluid pressure acting across said frames and with the first and second frames at least partially circumscribing the first and second panels, respectively;
   first and second gaps between the first frame and the first panel and between the second frame and the second panel, respectively; and
   placing first and second deformable seals in the first and second gaps, respectively.

12. A method as defined in claim 11 wherein the first frame is peripherally unrestrained by the first platen.

13. A method of making a glass laminated structure comprising:
   retaining first and second glass panels against first and second platens, respectively, and in spaced generally parallel relationship using differential fluid pressure acting across said panels;
   introducing a curable flowable material into the space between said panels during said step of retaining;
   curing the flowable material to provide said glass laminated structure;
   retaining first and second frames against the first and second platens, respectively, in confronting generally parallel relationship using differential fluid pressure acting across said frames and with the first and second frames at least partially circumscribing the first and second panels, respectively; and
   applying a negative pressure to first and second vacuum paths in the first platen which communicate, respectively, with the first panel and the first frame, said first and second vacuum paths being separate and substantially isolated from each other.

14. A method as defined in claim 13 wherein said first glass panel and the first platen have confronting faces of somewhat different configurations and said step of retaining holds the first panel against the first platen with sufficient force to deform the first panel to more closely conform the face of the first panel to the face of the first platen, said method includes placing the first and second platens in a generally horizontal position, said step of retaining includes retaining the first and second panels and frames on the first and second platens with the first and second platens in said horizontal position and said method includes pivoting the first and second platens to a generally vertical position in which the panels and frames are in said spaced, generally parallel relationship while continuing said step of retaining, said first and second frames having a peripheral opening when the first and second frames are retained in said spaced, generally parallel relationship and said method includes sealing said opening.

15. A method of making a glass laminated structure comprising:
   retaining first and second glass panels against first and second platens, respectively, and in spaced generally parallel relationship using differential fluid pressure acting across said panels;
   introducing a curable flowable material into the space between said panels during said step of retaining;
   curing the flowable material to provide said glass laminated structure;
   retaining first and second frames against the first and second platens, respectively, in confronting generally parallel relationship using differential fluid pressure acting across said frames and with the first and second frames at least partially circumscribing the first and second panels, respectively; and
   locating the first frame on the first platen utilizing locator pins prior to retaining the first frame on the first platen and locating the first glass panel on the first platen with respect to the first frame prior to said step of retaining the first glass panel on the first platen.

16. A method of making a glass laminated structure comprising:
   retaining first and second glass panels against first and second platens, respectively, and in spaced generally parallel relationship using differential fluid pressure acting across said panels;
   introducing a curable flowable material into the space between said panels during said step of retaining;
   curing the flowable material to provide said glass laminated structure; and
   the first platen has a face of desired configuration and the first panel is warped so that it does not have said desired configuration and said step of retaining holds the first panel against the first platen with sufficient force to deform the first panel to at least partially remove the warpage of the first panel and to more closely conform the first panel to said desired configuration.

17. An apparatus for use in making a laminated structure which includes first and second panels which are warped out of a desired configuration, said apparatus comprising:
   first and second platens having first and second broad faces, respectively, of said desired configuration, said first and second broad faces being adapted to have the first and second panels, respectively, retained thereon in confronting relationship therewith;
   each of said platens having a vacuum path means for communicating vacuum pressure to said broad face when the associated panel confronts said broad face whereby the panel can be retained on the platen and deformed to more closely conform the panel to said desired configuration;
   means for mounting the platens for pivotal movement between a first position in which the faces are exposed to facilitate the placement of the associated panel in confronting relationship therewith and a second position in which the faces are in spaced generally parallel relationship; and
   stop means defining said second position.

18. An apparatus as defined in claim 17 wherein said vacuum path means of said first platen includes inner and outer vacuum paths on said first face for retaining the first panel and a first member, respectively, said inner and outer vacuum paths being separate.

19. An apparatus as defined in claim 17 wherein the panels are in spaced generally parallel relationship in said second position to form a peripheral opening and said apparatus includes means for sealing said opening.

20. An apparatus as defined in claim 19 including means for varying the space between the panels in said second position.

21. An apparatus as defined in claim 17 wherein the faces of the platens are generally horizontal and generally vertical in said first and second positions, respectively.

22. An apparatus for use in making a laminated structure which includes first and second panels, said apparatus comprising:

first and second platens having first and second broad faces, respectively, said first and second faces being adapted to have the first and second panels, respectively, retained thereon in confronting relationship therewith;

each of said platens having a vacuum path means for communicating vacuum pressure to said face when the associated panel confronts said face whereby the panel can be retained on the platen;

means for mounting the platens for pivotal movement between a first position in which the faces are exposed to facilitate the placement of the associated panel in confronting relationship therewith and a second position in which the faces are in spaced generally parallel relationship;

stop means defining said second position; and said vacuum path means of said first platen including inner and outer vacuum paths on said first face for retaining the first panel and a first frame, respectively, said inner and outer vacuum paths being separate, said frame at least partially circumscribing the first panel.

23. An apparatus as defined in claim 22 including means for measuring the spacing between said faces in said second position.

* * * * *

UNITED STATES PATENT OFFICE
CERTIFICATE OF CORRECTION

Patent No. 4,439,392                    Dated Mar. 27, 1984

Inventor(s) Jerome C. Schutzler, E. Jechel

It is certified that error appears in the above-identified patent and that said Letters Patent are hereby corrected as shown below:

Column 2, line 10 change "type" to -- dye --

Column 3, line 34 change "platen" to -- platens --

Column 4, line 6 change "28" to -- 29 --

Column 5, line 51 change "any" to -- an --

Column 5, line 52 after "photochromic" insert -- epoxy of
    the type which is effective to prevent transmission of --

Column 6, line 2 after "grease" insert -- . --

Column 7, line 11 before "tape" delete -- the --

Column 7, line 52 after "Fig. 11" insert -- . --

Column 8, line 63 after "structure; and" begin a new paragraph

Signed and Sealed this

Thirteenth Day of November 1984

[SEAL]

Attest:

GERALD J. MOSSINGHOFF

Attesting Officer

Commissioner of Patents and Trademarks